United States Patent
Meng et al.

(10) Patent No.: US 11,803,204 B2
(45) Date of Patent: Oct. 31, 2023

(54) LOW-DROPOUT (LDO) VOLTAGE REGULATOR WITH VOLTAGE DROOP COMPENSATION CIRCUIT

(71) Applicant: QUALCOMM Incorporated, San Diego, CA (US)

(72) Inventors: Xiaodong Meng, Hong Kong (HK); Fan Yang, Singapore (SG); Yufei Pan, Singapore (SG); Hua Guan, San Diego, CA (US); Kuan Chuang Koay, Singapore (SG); Jize Jiang, Singapore (SG)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 17/239,377

(22) Filed: Apr. 23, 2021

(65) Prior Publication Data
US 2022/0342434 A1 Oct. 27, 2022

(51) Int. Cl.
G05F 1/59 (2006.01)
G05F 1/575 (2006.01)
H04B 1/40 (2015.01)

(52) U.S. Cl.
CPC ............ *G05F 1/59* (2013.01); *G05F 1/575* (2013.01); *H04B 1/40* (2013.01)

(58) Field of Classification Search
None
See application file for complete search history.

(56) References Cited

U.S. PATENT DOCUMENTS

| | | | |
|---|---|---|---|
| 6,677,735 B2 * | 1/2004 | Xi | G05F 1/575 323/280 |
| 6,845,126 B2 | 1/2005 | Dent et al. | |
| 7,659,773 B2 * | 2/2010 | Choi | H03K 17/007 327/143 |
| 9,170,592 B2 * | 10/2015 | Seymour | G06F 1/30 |
| 9,323,263 B2 | 4/2016 | Jain et al. | |
| 9,417,643 B2 * | 8/2016 | Saint-Laurent | G05F 1/468 |
| 9,430,729 B2 * | 8/2016 | Waffaoui | G06K 7/01 |
| 10,218,273 B2 * | 2/2019 | Ergin | H02M 3/1584 |
| 10,579,083 B1 * | 3/2020 | Gonapati | G05F 1/59 |
| 10,866,606 B2 * | 12/2020 | Hu | G05F 1/575 |
| 11,095,216 B2 * | 8/2021 | Lo | G05F 1/575 |

(Continued)

OTHER PUBLICATIONS

International Search Report and Written Opinion—PCT/US2022/023702—ISA/EPO—dated Jul. 8, 2022.

*Primary Examiner* — Thomas J. Hiltunen
(74) *Attorney, Agent, or Firm* — Loza & Loza, LLP

(57) ABSTRACT

The disclosure relates to an apparatus including: a first set of one or more field effect transistors (FETs) coupled between a first voltage rail and a load; a second set of one or more FETs coupled between the first voltage rail and the load; a gate voltage control circuit configured to: provide a first set of gate voltages to first and second gates of the first and second sets of one or more FETs in accordance with a first mode of operation, respectively; and provide a second set of gate voltages to the first and second gates of the first and second sets of one or more FETs in accordance with a second mode of operation, respectively; and a voltage droop compensation circuit configured to control an output voltage across the load during a transition from the first mode of operation to the second mode of operation.

21 Claims, 6 Drawing Sheets

(56) References Cited

U.S. PATENT DOCUMENTS

| | | | |
|---|---|---|---|
| 2014/0266103 A1* | 9/2014 | Wang | G05F 1/565 |
| | | | 323/275 |
| 2014/0266143 A1* | 9/2014 | Saint-Laurent | G05F 1/462 |
| | | | 323/353 |
| 2018/0292851 A1 | 10/2018 | Mahajan et al. | |
| 2020/0064875 A1* | 2/2020 | Gonapati | G05F 1/573 |
| 2021/0109554 A1 | 4/2021 | Ahmed | |
| 2021/0165437 A1* | 6/2021 | Nasir | G05F 1/575 |
| 2021/0203228 A1* | 7/2021 | Liu | G05F 1/571 |

* cited by examiner

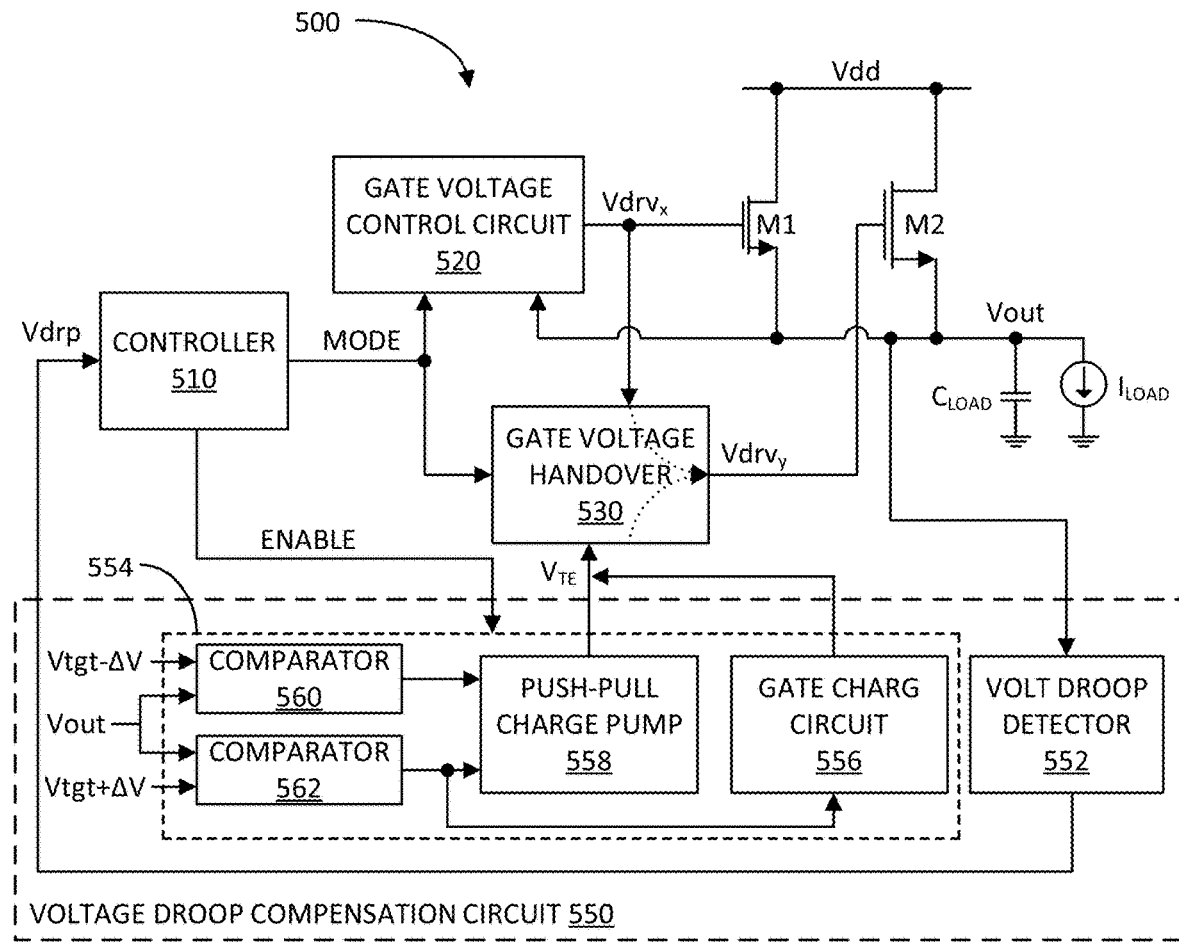
FIG. 5A
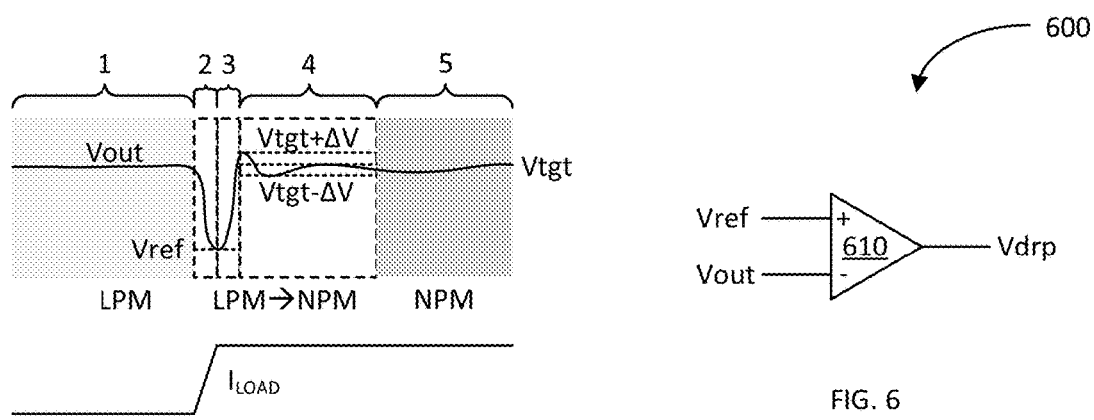
FIG. 5B
FIG. 6

LOW-DROPOUT (LDO) VOLTAGE REGULATOR WITH VOLTAGE DROOP COMPENSATION CIRCUIT

FIELD

Aspects of the present disclosure relate generally to voltage regulators, and in particular, to a low-dropout (LDO) voltage regulator with voltage droop compensation circuit.

BACKGROUND

An integrated circuit (IC) typically includes a power management integrated circuit (PMIC) or power supply circuit to provide one or more supply voltages to one or more signal processing cores of the IC. Because the signal processing cores are often performing various operations at different times, the amount of current drawn by signal processing cores from the PMIC or the power supply circuit varies over time. If the signal processing cores demand a significant increase in the current they draw during a relatively short duration, the PMIC or power supply circuit may not be able to supply the needed current without adversely affecting the supply voltage. Such adverse effect on the supply voltage may take the form of a supply voltage droop. Such supply voltage droop may result in malfunction and/or damage to the signal processing cores and/or PMIC or power supply circuit.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes a first set of one or more field effect transistors (FETs) coupled between a first voltage rail and a load; a second set of one or more FETs coupled between the first voltage rail and the load; a gate voltage control circuit configured to: provide a first set of gate voltages to the first and second sets of one or more FETs in accordance with a first mode of operation, respectively, and provide a second set of gate voltages to the first and second sets of one or more FETs in accordance with a second mode of operation, respectively; and a voltage droop compensation circuit configured to control a voltage across the load during a transition from the first mode to the second mode.

Another aspect of the disclosure relates to a method. The method includes providing a first set of one or more gate voltages to first and second sets of one or more FETs in accordance with a first mode of operation, respectively, the first and second sets of one or more FETs are coupled between a voltage rail and a load; providing a second set of gate voltages to the first and second sets of one or more FETs in accordance with a second mode of operation, respectively; and controlling a voltage across the load during a transition from the first mode of operation to the second mode of operation.

Another aspect of the disclosure relates to an apparatus. The apparatus includes means for providing a first set of gate voltages to first and second gates of first and second sets of one or more FETs in accordance with a first mode of operation, respectively, wherein the first and second sets of one or more FETs are coupled between a voltage rail and a load; means for providing a second set of gate voltages to the first and second gates of the first and second sets of one or more FETs in accordance with a second mode of operation, respectively; and means for controlling an output voltage across the load during a transition from the first mode of operation to the second mode of operation.

Another aspect of the disclosure relates to a wireless communication device. The wireless communication devices includes at least one antenna; a transceiver configured to: receive a radio frequency (RF) receive signal via the at least one antenna and process the RF receive signal to generate a baseband (BB) receive signal, and receive a BB transmit signal and process the BB transmit signal to generate an RF transmit signal, wherein the RF transmit signal is provided to the at least one antenna for wireless transmission; one or more digital processing cores configured to process the BB receive signal and generate the BB transmit signal; and a power supply circuit configured to provide a supply voltage to the one or more digital processing cores. The power supply circuit includes: a first set of one or more field effect transistors (FETs) coupled between a voltage rail and the one or more digital processing cores, a second set of one or more FETs coupled between the voltage rail and the one or more digital processing cores, a gate voltage control circuit configured to: provide a first set of gate voltages to first and second gates of the first and second sets of one or more FETs in accordance with a first mode of operation, respectively, and provide a second set of gate voltages to the first and second gates of the first and second sets of one or more FETs in accordance with a second mode of operation, respectively, and a voltage droop compensation circuit configured to control the supply voltage during a transition from the first mode of operation to the second mode of operation.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

BRIEF DESCRIPTION OF THE DRAWINGS

FIG. 5A illustrates a block diagram of another example low-dropout (LDO) voltage regulator with a voltage droop compensation circuit in accordance with another aspect of the disclosure.

FIG. 5B illustrates a graph of an example output voltage Vout generated by the low-dropout (LDO) voltage regulator with the voltage droop compensation circuit of FIG. 5A in accordance with another aspect of the disclosure.

FIG. 6 illustrates a schematic diagram of an example voltage droop detector in accordance with another aspect of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
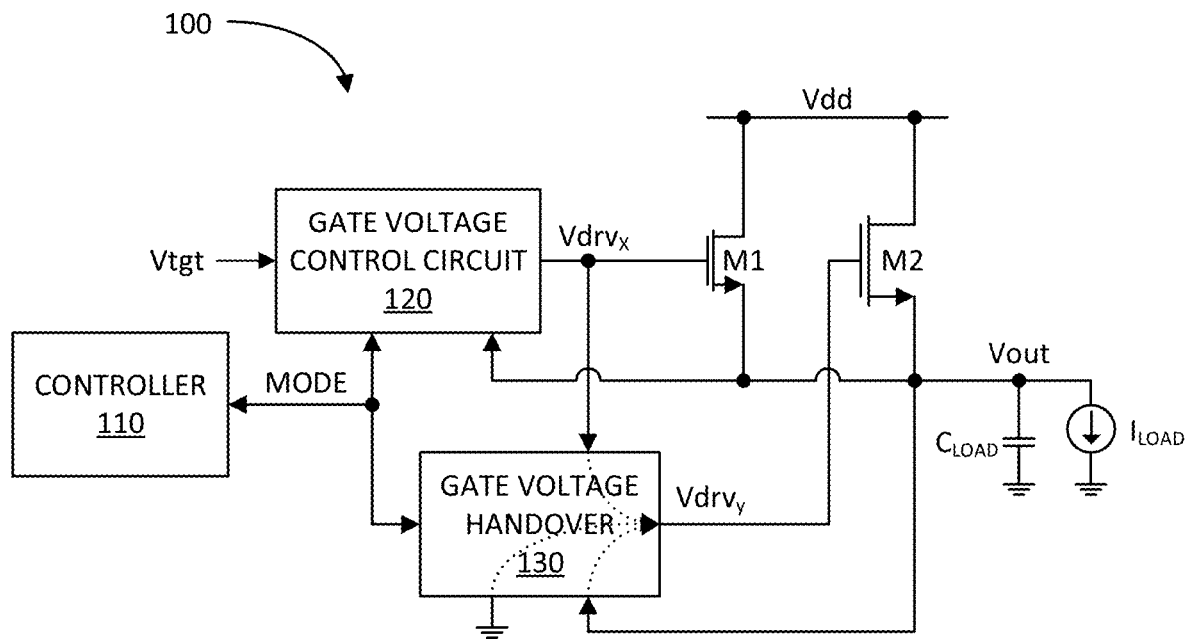
FIG. 1 illustrates a block diagram of an example low-dropout (LDO) voltage regulator in accordance with an aspect of the disclosure.

FIG. 1 illustrates a block diagram of an example low-dropout (LDO) voltage regulator 100 in accordance with an aspect of the disclosure. The LDO voltage regulator 100 includes a first set of one or more field effect transistors (FETs) M1 coupled between a first (e.g., upper) voltage rail Vdd and a load, represented as a current source $I_{LOAD}$ coupled in parallel with a load capacitor $C_{LOAD}$ between the first set of one or more field effect transistors (FETs) M1 and a second (e.g., lower) voltage rail (e.g., ground). The LDO voltage regulator 100 further includes a second set of one or more FETs M2 coupled between the first voltage rail Vdd and the load. FETs M1 and M2 may each be configured as an n-channel metal oxide semiconductor (NMOS) FET.

The first set of one or more FETs M1 includes a first effective channel width to length ratio (W/L), and the second set of one or more FETs M2 includes a second effective W/L that is larger than the first W/L. When the load is drawing a relatively small current, the first set of one or more FETs M1, being configured with the smaller first effective W/L, may be enabled or turned on, while the second set of one or more FETs M2 may be disabled or turned off via a first set of gate voltages $Vdrv_x$ and $Vdrv_y$, respectively. When the load draws a relatively large current, the first and second sets of one or more FETs M1 and M2, both providing a cumulative effective W/L being substantially a sum of the first and second effective W/L, may be enabled or turned on via a second set of gate voltages $Vdrv_x$ and $Vdrv_y$ (which may be substantially the same, e.g., $Vdrv_y = Vdrv_x$), respectively. To achieve the larger effective W/L, the second set of one or more FETs M2 may be configured larger than the first set of one or more FETs M2, and/or may include more FETs coupled in parallel as compared to that of the first set of one or more FETs M1.

The LDO voltage regulator 100 further includes a gate voltage control circuit 120 configured to generate the gate voltage $Vdrv_x$ based on an output voltage Vout across the load and a target voltage Vtgt. Thus, the gate voltage control circuit 120 regulates the output voltage Vout such that the output voltage Vout is substantially the same as the target voltage Vtgt. If the gate voltage control circuit 120 determines that the load is drawing more current than the first set of one or more FETs M1 can supply the load, the gate voltage control circuit 120 communicates with a controller 110, which may change a mode of operation from a first (e.g., relatively small load current or low power mode (LPM)) mode of operation to a second (e.g., relatively large current or normal power mode (NPM)) mode of operation.

The LDO voltage regulator 100 further includes a gate voltage handover circuit 130. The gate voltage handover circuit 130 is configured to generate a gate voltage $Vdrv_y$ for the second set of one or more FETs M2 based on the mode of operation as dictated by the controller 110. For example, if the controller 110 dictates the first (e.g., relatively small load current or LPM) mode of operation, the gate voltage handover circuit 130 couples the second voltage rail (e.g., ground or $Vdrv_y = 0V$) to the gate of the second set of one or more FETs M2 to disable or turn off the second set of one or more FETs M2. If the controller 110 dictates the second (e.g., relatively large load current or NPM) mode of operation, the gate voltage handover circuit 130 couples the output of the gate voltage control circuit 120 to the gate of the second set of one or more FETs M2 to provide it the gate voltage $Vdrv_x$ (e.g., $Vdrv_y = Vdrv_x$) so that the second set of one or more FETs M2 are enabled or turned on, and controlled by the gate voltage $Vdrv_x$. Additionally, in response to the mode change, the gate voltage handover circuit 130 may temporarily couple the output of the LDO voltage regulator 100 to the gate of the second set of one or more FETs M2 (e.g., $Vdrv_y = Vout$) as an intermediate state of the gate voltage handover circuit 130 during a transition from the first mode of operation to the second mode of operation.

Figure 2:
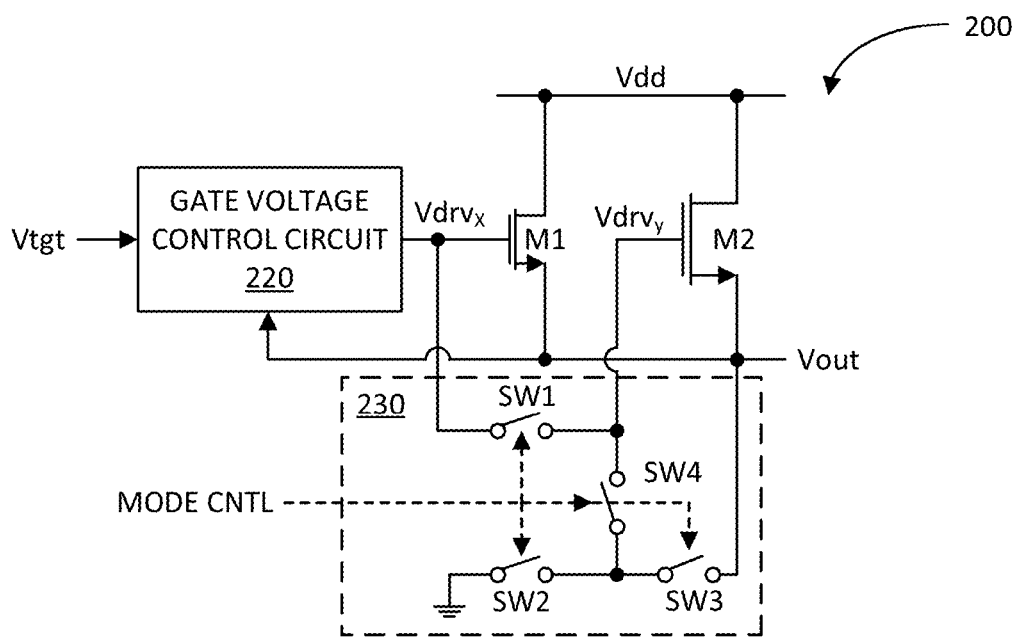
FIG. 2 illustrates a block diagram of another example low-dropout (LDO) voltage regulator in accordance with another aspect of the disclosure.

FIG. 2 illustrates a block diagram of another example low-dropout (LDO) voltage regulator 200 in accordance with another aspect of the disclosure. The LDO voltage regulator 200 is an example of a more detailed implementation of the LDO voltage regulator 100 previously discussed. More specifically, the LDO voltage regulator 200 includes a more detailed example implementation of the gate voltage handover circuit.

The LDO voltage regulator 200 includes a first set of one or more FETs M1 with a first effective W/L coupled between a first voltage rail Vdd and a load (not explicitly shown in FIG. 2). The LDO voltage regulator 200 further includes a second set of one or more FETs M2 with a second effective W/L larger than the first effective W/L; the second set of one or more FETs M2 being coupled between the first voltage rail Vdd and the load. The LDO voltage regulator 200 additionally includes a gate voltage control circuit 220 configured to generate a gate voltage $Vdrv_x$ for the gate of the first set of one or more FETs M1 in accordance with a first (e.g., relatively small load current or LPM) mode of operation, and for both the gates of the first and second sets of one or more FETs M1 and M2 in accordance with a second (e.g., relatively large load current or NPM) mode of operation. As previously discussed, the gate voltage control circuit 220 is configured to gate voltage $Vdrv_x$ to regulate an output voltage Vout across the load such that the output voltage Vout is substantially the same as a target voltage Vtgt.

The LDO voltage regulator 200 further includes a gate voltage handover circuit 230. The gate voltage handover circuit 230 includes a first switching device SW1 coupled between the gate of the first set of one or more FETs M1 and the gate of the second set of one or more FETs M2. The gate voltage handover circuit 230 includes a second switching device SW2 coupled between a second voltage rail (e.g., ground) and the gate of the second set of one or more FETs M2 via a fourth switching device SW4. Additionally, the gate voltage handover circuit 230 includes a third switching device SW3 coupled between an output of the LDO voltage regulator 200 and the gate of the second set of one or more FETs M2 via the fourth switching device SW4. The switching devices SW1-SW4 are controlled by a mode control signal generated by a controller (e.g., such as controller 110), not explicitly shown in FIG. 2.

In operation, if the controller generates the mode control signal to set the first (e.g., relatively small load current or LPM) mode of operation, the first and third switching devices SW1 and SW3 are open, and the second and fourth switching devices SW2 and SW4 are closed. In this configuration, the gate voltage handover circuit 230 couples the second voltage rail (e.g., ground or $Vdrv_y$=0V) to the gate of the second set of one or more FETs M2 via the second and fourth switching devices SW2 and SW4 to disable or turn off the second set of one or more FETs M2. The first and third switching devices SW1 and SW3 are open to substantially isolate the gate of the first set of one or more FETs M1 and the LDO regulator output from the second voltage rail (e.g., ground).

If the controller generates the mode control signal to set the second (e.g., relatively large load current or NPM) mode of operation, the first switching device SW1 is closed, and the second, third, and fourth switching devices SW2-SW4 are open. In this configuration, the gate voltage handover circuit 230 couples the output of the gate voltage control circuit 220 to the gate of the second set of one or more FETs M2 via the first switching device SW1 to provide it the gate voltage $Vdrv_x$ (e.g., $Vdrv_y$=$Vdrv_x$) so that the second set of one or more FETs M2 are enabled or turned on, and controlled by the gate voltage $Vdrv_x$. The second to fourth switching devices SW2-SW4 are open to substantially isolate the gates of the first and second sets of one or more FETs M1 and M2 from the LDO regulator output and from the second voltage rail (e.g., ground).

Additionally, as discussed, the gate voltage handover circuit 230 may be temporarily configured in an intermediate state during the transition from the first mode of operation to the second mode of operation. In accordance with the intermediate state, the first and second switching devices SW1-SW2 are open, and the third and fourth switching devices SW3-SW4 are closed. In this configuration, the gate voltage handover circuit 230 couples the output of the LDO voltage regulator 200 to the gate of the second set of one or more FETs M2 (e.g., $Vdrv_y$=Vout) to maintain the second set of one or more FETs M2 disabled or turned off by setting the gate-to-source voltage ($V_{GS}$) of the second set of one or more FETs M2 to 0V during the transition.

Figure 3:
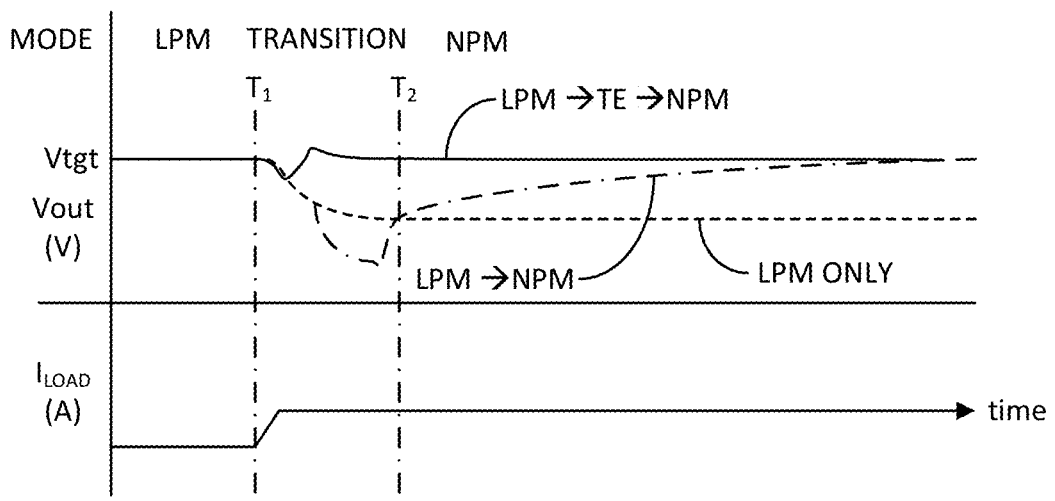
FIG. 3 illustrates a graph of an example output voltage Vout of a low-dropout (LDO) voltage regulator operating in different modes in accordance with another aspect of the disclosure.

FIG. 3 illustrates a graph of example output voltage Vout of various low-dropout (LDO) voltage regulators described herein in accordance with another aspect of the disclosure. The x- or horizontal axis of the graph represents time. The upper portion of the y- or vertical axis represents the output voltage Vout in Volts (V) of an LDO voltage regulator, and the lower portion of the y- or vertical axis represents the load current in amperes (A). The time-axis may be divided into: (1) when the LDO voltage regulator is operating in the first mode of operation (e.g., relatively low load current or LPM); (2) when the LDO voltage regulator is operating in the second mode of operation (e.g., relatively high load current or NPM); and (3) when the LDO voltage regulator is operating during a transition from the first mode of operation to the second mode of operation.

In the output voltage Vout portion of the graph, there are three (3) output voltage Vout responses to a sudden increase in the load current demand that occurs at time $T_1$. The first curve, depicted as a dashed line, is the output voltage Vout response to the increased load current demand when the LDO voltage regulator is operating only in LPM mode. The second curve, depicted as a dashed-dotted line, is the output voltage Vout when the LDO voltage regulator is operating in LPM mode before the increased load current demand and then transitions to the NPM mode. And, the third curve is the output voltage Vout response to the increased load demand in accordance with an LDO voltage regulator implementation that includes a voltage droop compensation circuit described further herein.

As indicated in the load current $I_{LOAD}$ portion of the graph, an increased load current demand occurs at time $T_1$. Before the increased load current demand (<$T_1$), the LDO voltage regulator, operating in LPM mode, is able to maintain the output voltage Vout substantially at the target voltage Vtgt while meeting the relatively small load current demand, as indicated by the LPM only curve. After the increased load current demand (>$T_1$), the output voltage Vout decreases below the target voltage Vtgt because the first set of one or more FETs M1 is not able to supply the increased load current demand while maintaining the output voltage Vout substantially at the target voltage Vtgt. Accordingly, the output voltage Vout decreases and settles to a voltage level significantly lower than the target voltage Vtgt.

If the LDO voltage regulator is able to transition from LPM mode to NPM mode, before the increased load current demand (<$T_1$), the LDO voltage regulator, operating in LPM mode, is able to maintain the output voltage Vout at substantially the target voltage Vtgt, while meeting the relatively small load current demand, as indicated by the LPM→NPM curve. After the increased load current demand (>$T_1$), the output voltage Vout decreases below the target voltage Vtgt because the first set of one or more FETs M1 is not able to supply the increased load current demand while maintaining the output voltage Vout substantially at the target voltage Vtgt. In response, the gate voltage control circuit 120 detects the decrease in the output voltage Vout, and informs the controller 110 that a mode change is needed. In response, the controller 110 changes the mode to NPM, which causes the gate voltage handover circuit 130 to relay the gate voltage $Vdrv_x$ to the gate of the second set of one or more FETs M2 (e.g., $Vdrv_y$=$Vdrv_x$). Because the mode change does not occur instantly, during a transition period between times $T_1$ and $T_2$, the output voltage Vout continues to decrease until the second set of one or more FETs M2 are enabled or turned on. When this occurs, the output voltage Vout begins to recover at about time T$_2$ and gradually increases towards the target voltage Vtgt.

Although the LDO voltage regulator is able to cause the output voltage Vout to recover, there is a significant decrease in the output voltage Vout below the target voltage Vtgt during the transition T$_1$ to T$_2$. Furthermore, there is a significant delay between the time the output voltage Vout begins to recover and the time it fully recovers. The output voltage Vout not being at the target voltage Vtgt for such a long time may cause damage or malfunction to the circuits (i.e., the load) to which the output voltage Vout is provided.

Figure 4:
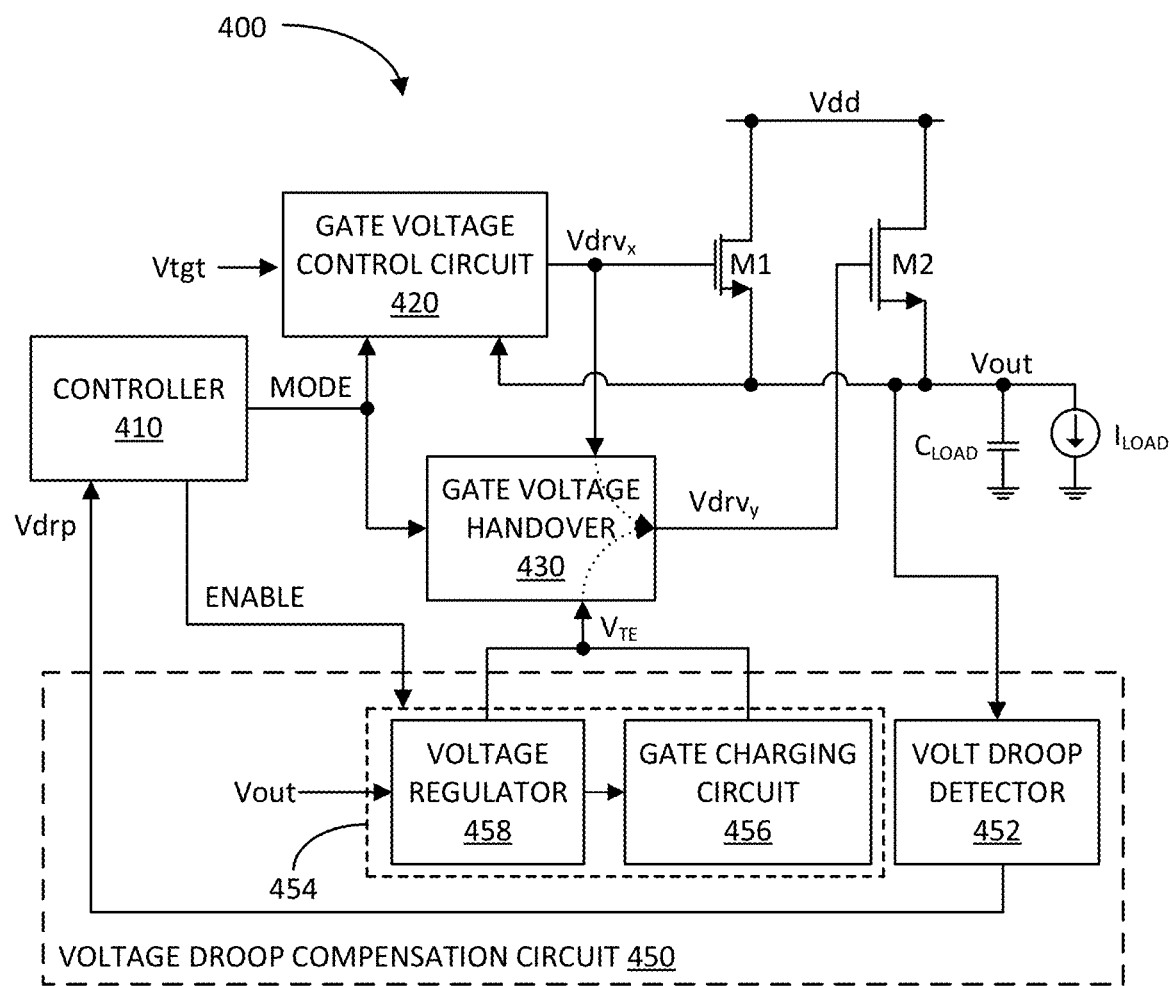
FIG. 4 illustrates a block diagram of another example low-dropout (LDO) voltage regulator with a voltage droop compensation circuit in accordance with another aspect of the disclosure.

FIG. 4 illustrates a block diagram of another example low-dropout (LDO) voltage regulator 400 with a voltage droop compensation circuit 450 in accordance with another aspect of the disclosure. In summary, the voltage droop compensation circuit 450 is enabled during the transition from a first (e.g., LPM) mode to a second (e.g., NPM) mode to reduce the voltage droop that occurs in the output voltage Vout as a result of an increased load current demand. As discussed in more detail, the voltage droop compensation circuit 450 includes a voltage droop detector to detect a voltage droop of the output voltage Vout, and a voltage control circuit configured to control the output voltage Vout to be within a defined range of the target voltage Vtgt.

More specifically, the LDO voltage regulator 400 includes a first set of one or more FETs M1 with a first effective W/L coupled between a first voltage rail Vdd and a load, represented as a current source LOAD coupled in parallel with a load capacitor C$_{LOAD}$, between an output of the LDO voltage regulator 400 and a second voltage rail (e.g., ground). The LDO voltage regulator 400 includes a second set of one or more FETs M2 with a second effective W/L coupled between the first voltage rail Vdd and the load, wherein the second effective W/L is larger than the first effective W/L. The LDO voltage regulator 400 further includes a gate voltage control circuit 420 configured to generate a gate voltage Vdrv$_x$ for the first set of one or more FETs M1 to regulate an output voltage Vout such that the output voltage Vout is substantially at a target voltage Vtgt. The LDO voltage regulator 400 further includes a gate voltage handover circuit 430 configured to generate a gate voltage Vdrv$_y$ for the second set of one or more FETs M2 based on a mode signal generated by a controller 410.

The voltage droop compensation circuit 450 includes a voltage droop detector 452 and a voltage control circuit 454. The voltage control circuit 454, in turn, includes a gate charging circuit 456 and a voltage regulator 458. The voltage droop detector 452 includes an input coupled to the output of the LDO voltage regulator 400 to receive the output voltage. The voltage droop detector 452 is configured to generate a voltage droop detection signal Vdrp in response to detecting a voltage droop in the output voltage Vout that decreases to or below a reference voltage. The voltage droop detector 452 includes an output, at which the voltage droop detection signal Vdrp is generated, coupled to an input of the controller 410.

The controller 410 is configured to generate an enable signal in response to the voltage droop detection signal Vdrp. The controller 410 includes an enable output, at which the enable signal is generated, coupled to an input of the voltage control circuit 454. In response to the enable signal, the gate charging circuit 456 is configured to charge the gate of the second set of one or more FETs M2 with a transient enhancement voltage V$_{TE}$ in response to voltage droop detection signal Vdrp via the enable signal. During the transition from the first mode of operation to the second mode of operation (e.g., from LPM to NPM), the gate voltage handover circuit 430 provides the transient enhancement voltage V$_{TE}$ to the gate of the second set of one or more FETs M2 (e.g., Vdrv$_y$=V$_{TE}$).

The voltage regulator 458 is configured to regulate the output voltage Vout in response to the output voltage Vout reaching a first threshold voltage in response to the charging of the gate of the second set of one or more FETs M2 by the gate charging circuit 456. In particular, the voltage regulator 458 is configured to regulate the output voltage Vout by controlling the transient enhancement voltage V$_{TE}$ (e.g., the gate voltage Vdrv$_y$) applied to the gate of the second set of one or more FETs M2 via the gate voltage handover circuit 430. The voltage regulator 458 is configured to regulate the output voltage Vout to within a range bounded by the first threshold voltage and a second threshold voltage. Additionally, the voltage regulator 458 is configured to disable the gate charging circuit 456 in response to the output voltage Vout reaching the first threshold voltage. When the gate voltage handover circuit 430 is configured in accordance with the NPM mode, which entails routing the gate voltage Vdrv$_x$ to the gate of the second set of one or more FETs M2 (e.g., Vdrv$_y$=Vdrv$_x$), the controller 410 disables the voltage control circuit 454, or more specifically, the voltage regulator 458 via a non-asserted enable signal.

With reference again to FIG. 3, before the increased load current demand (<T$_1$), the LDO voltage regulator 400, operating in LPM mode, is able to maintain the output voltage Vout at substantially the target voltage Vtgt, while meeting the relatively small load current demand, as indicated by the LPM→TE→NPM curve. After the increased load current demand (>T$_1$), the output voltage Vout decreases below the target voltage Vtgt because the first set of one or more FETs M1 is not able to supply the increased load current demand while maintaining the output voltage Vout at substantially the target voltage Vtgt. In response, the voltage droop compensation circuit 450 detects the voltage droop in the output voltage Vout using the voltage droop detector 452, charges the gate of the second set of one or more FETs M2 via the transient enhancement voltage V$_{TE}$ generated by the gate charging circuit 456, and then regulates the output voltage Vout by controlling the transient enhancement voltage V$_{TE}$ using the voltage regulator 458. As a result, the voltage droop during the transition T$_1$ to T$_2$ is significantly reduced, and regulated to be within a range of the target voltage Vtgt.

Also, in response to the voltage droop at time T$_1$, the gate voltage control circuit 120 detects the decrease in the output voltage Vout, and informs the controller 110 that a mode change is needed. In response, the controller 410 effectuates the mode change to NPM by time T$_2$, which causes the gate voltage handover circuit 430 to route the gate voltage Vdrv$_x$ to the gate of the second set of one or more FETs M2 (e.g., Vdrv$_y$=Vdrv$_x$) As the voltage droop compensation circuit 450 has reduced the voltage droop and brought the output voltage Vout to substantially the target voltage Vtgt, the transition from the LPM mode to the NPM mode is smoother. Once the transition to the NPM mode is complete, the controller 410 disables the voltage droop compensation circuit 450 via the non-asserted enable signal.

FIG. 5A illustrates a block diagram of another example low-dropout (LDO) voltage regulator 500 with a voltage droop compensation circuit 550 in accordance with another aspect of the disclosure. The LDO voltage regulator 500 is similar to the LDO voltage regulator 400, and includes many similar elements, such as the first set of one or more FETs M1, the second set of one or more FETs M2, a gate voltage control circuit 520, a gate voltage handover circuit 530, and a controller 510 in a similar configuration as the corresponding elements in LDO voltage regulator 400. The LDO voltage regulator 500 includes a more detailed example implementation of the voltage droop compensation circuit 450 of LDO voltage regulator 400.

More specifically, the voltage droop compensation circuit 550 includes a voltage droop detector 552 and a voltage control circuit 554. The voltage control circuit 554 includes a gate charging circuit 556 and a voltage regulator including a push-pull charge pump 558, a first comparator 560, and a second comparator 562. The voltage droop detector 552 is configured to generate a voltage droop detection signal Vdrp in response to detecting that the output voltage Vout has decreased to or below a reference voltage. In response to the voltage droop detection signal Vdrp, the controller 510 generates the enable signal.

In response to the enable signal, the gate charging circuit 556 charges the gate of the second set of one or more FETs with a transient enhancement voltage $V_{TE}$ via the gate voltage handover circuit 530. In response to the output voltage Vout increasing to a first threshold voltage Vtgt+ΔV as a result of turning on the second set of one or more FETs M2 via $V_{TE}$, the comparator 562 generates an asserted signal to disable the gate charging circuit 556 and enable a current source in the push-pull charge pump to reduce the output voltage Vout. In response to the output voltage Vout reducing to a second threshold voltage Vtgt−ΔV, the comparator 560 generates an asserted signal to enable a current source in the push-pull charge pump to increase the output voltage Vout. Thus, the voltage regulator regulates the output voltage Vout to a range bounded by the first threshold voltage Vtgt+ΔV and the second threshold voltage Vtgt−ΔV. As discussed with respect to the LDO voltage regulator 400, when the controller 510 has completed configuring the gate voltage handover circuit 530 in the NPM mode (where the gate voltage handover circuit 530 routes the gate voltage $Vdrv_x$ to the gate of the second set of one or more FETs M2), the controller 510 disables the voltage droop compensation circuit 550 via a non-asserted enable signal.

FIG. 5B illustrates a graph of an example output voltage Vout generated by the LDO voltage regulator 500 in accordance with another aspect of the disclosure. The x- or horizontal axis of the graph represents time. The upper portion of the y- or vertical axis of the graph represents the output voltage Vout in Volts (V). The lower portion of the y- or vertical axis of the graph represents load current LOAD in Amperes (A). As depicted in the upper portion of the graph, the horizontal or time axis may be divided into five (5) time intervals 1-5

During time interval "1", the LDO voltage regulator 500 is operating under the LPM mode of operation to regulate the output voltage Vout to substantially the target voltage Vtgt by controlling the gate voltage $Vdrv_x$ applied to the gate of the first set of one or more FETs M1. In accordance with LPM mode, the second set of one or more FETs M2 is disabled or turned off via a grounded gate voltage (e.g., $Vdrv_y$=0V) as the load current $I_{LOAD}$ is relatively small.

During the time interval "2", the load current $I_{LOAD}$ increases rapidly, resulting in a voltage droop in the output voltage Vout that decreases to or below a reference voltage Vref. In response to the voltage droop, the voltage droop detector 552 generates the voltage droop detection signal Vdrp. In response to the voltage droop detection signal Vdrp, the controller 510 generates the enable signal. And, in response to the enable signal, the gate charging circuit 556 charges the gate of the second set of one or more FETs M2 by generating a transient enhancement voltage $V_{TE}$, which the gate voltage handover circuit 530 routes to the gate of the second set of one or more FETs M2 (e.g., $Vdrv_y$=$V_{TE}$). This enables or turns on the second set of one or more FETs M2. As a result, the second set of one or more FETs M2 supplies additional current to the load causing the output voltage Vout to rise as indicated in time interval "3".

In response to the output voltage Vout reaching the first threshold voltage Vtgt+ΔV, the comparator 562 generates a signal to cause the push-pull charge pump 558 to sink current from the output of the LDO voltage regulator 500; the signal also disables the gate charging circuit 556. In response to the push-pull charge pump 558 sinking current from the output of the LDO voltage regulator 500, the output voltage Vout decreases as indicated in time interval "4", and may decrease to the second threshold voltage Vtgt−ΔV. In response to decreasing to the second threshold voltage Vtgt−ΔV, the comparator 560 generates a signal to cause the push-pull charge pump 558 to source current to the output of the LDO voltage regulator 500. In response to the push-pull charge pump 558 sourcing current to the output of the LDO voltage regulator 500, the output voltage Vout increases as further indicated in time interval "4. Accordingly, the push-pull charge pump 558 and the comparators 560 and 562 operate as a voltage regulator to regulate the output voltage Vout to a range bounded by the first threshold voltage Vtgt+ΔV and the second threshold voltage Vtgt−ΔV.

Also, in response to the voltage droop detection signal Vdrp, the controller 510 sets the mode of operation to NPM, where the gate voltage handover circuit 530 routes the gate voltage $Vdrv_x$ to the second set of one or more FETs M2, which takes effect at the beginning of time interval "5". At such time, the controller 510 deasserts the enable signal; thereby, essentially disabling the voltage droop compensation circuit 550. In accordance with the NPM mode of operation, the gate voltage control circuit 520 generates the gate voltage $Vdrv_x$ for the first and second sets of one or more FETs M1 and M2 to regulate the output voltage Vout to be substantially at the target voltage Vtgt. As previously discussed, the voltage droop compensation circuit 550 reduces the voltage droop in the output voltage Vout and causes the output voltage Vout to rise to within +/−ΔV of the target voltage Vtgt during the transition from LPM to NPM modes of operation.

FIG. 6 illustrates a schematic diagram of an example voltage droop detector 600 in accordance with another aspect of the disclosure. The voltage droop detector 600 includes a comparator 610 (e.g., an operational amplifier) including a first (e.g., negative) input configured to receive the output voltage Vout, a second (e.g., positive) input configured to receive the reference voltage Vref, and an output configured to produce the voltage droop detection signal Vdrp. In operation, if the output voltage Vout is above the reference voltage Vref, the comparator 610 generates a non-asserted (e.g., logic low) voltage droop detection signal Vdrp, indicating no output voltage droop. If the output voltage Vout is below the reference voltage Vref, the comparator 610 generates an asserted (e.g., logic high) voltage droop detection signal Vdrp, indicating an output voltage droop.

Figure 7:
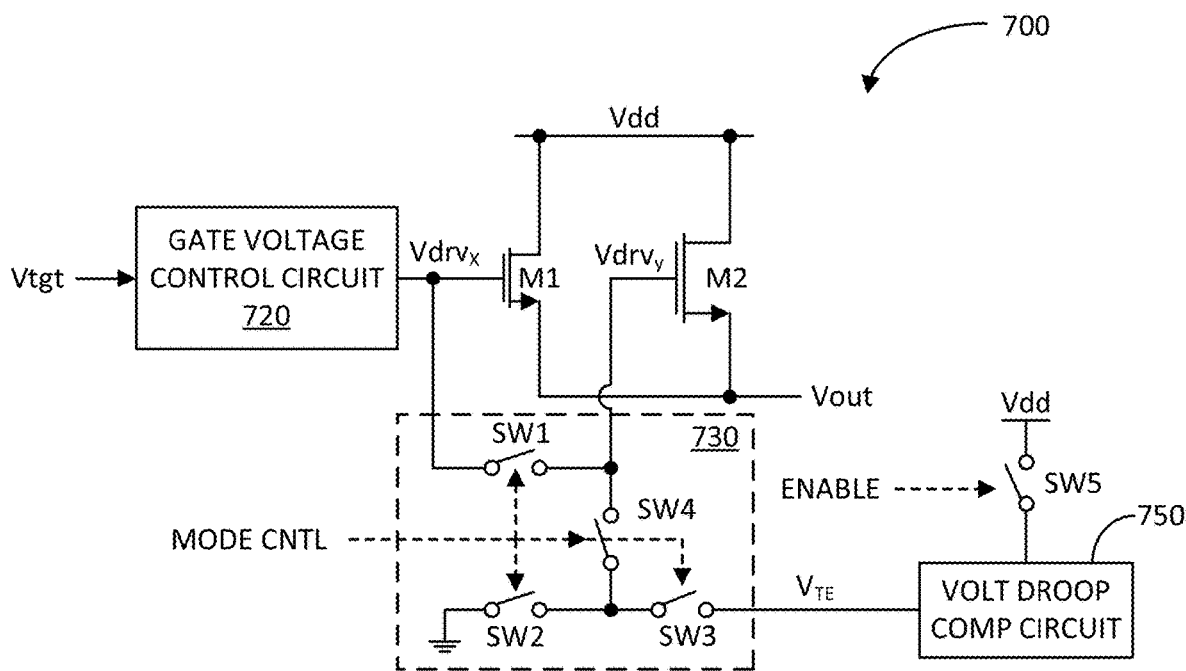
FIG. 7 illustrates a schematic/block diagram of another example low-dropout (LDO) voltage regulator with a voltage droop compensation circuit in accordance with another aspect of the disclosure.

FIG. 7 illustrates a schematic diagram of an example low-dropout (LDO) voltage regulator 700 in accordance with another aspect of the disclosure. The LDO voltage regulator 700 is an example of a more detailed implementation of the LDO voltage regulator 400 or 500 previously discussed. In particular, the LDO voltage regulator 700 includes a more detailed example implementation of a gate voltage handover circuit.

More specifically, the LDO voltage regulator 700 includes a first set of one or more FETs M1 with a first effective W/L coupled between a first voltage rail Vdd and a load (not explicitly shown in FIG. 7). The LDO voltage regulator 700 further includes a second set of one or more FETs M2 with a second effective W/L larger than the first effective W/L; the second set of one or more FETs M2 being coupled between the first voltage rail Vdd and the load. The LDO voltage regulator 700 additionally includes a gate voltage control circuit 720 configured to generate a gate voltage $Vdrv_x$ for the first gate of the first set of one or more FETs M1 in accordance with a first (e.g., relatively small load current or LPM) mode of operation, and for the first and second gates of the first and second sets of one or more FETs M1 and M2 in accordance with a second (e.g., relatively large load current or NPM) mode of operation, respectively. As previously discussed, the gate voltage control circuit 720 is configured to generate the gate voltage $Vdrv_x$ to regulate an output voltage Vout across the load to be substantially at a target voltage Vtgt.

The LDO voltage regulator 700 further includes a gate voltage handover circuit 730. The gate voltage handover circuit 730 includes a first switching device SW1 coupled between the gate of the first set of one or more FETs M1 and the gate of the second set of one or more FETs M2. The gate voltage handover circuit 730 includes a second switching device SW2 coupled between a second voltage rail (e.g., ground) and the gate of the second set of one or more FETs M2 via a fourth switching device SW4. Additionally, the gate voltage handover circuit 730 includes a third switching device SW3 coupled between an output of a voltage droop compensation circuit 750 and the gate of the second set of one or more FETs M2 via the fourth switching device SW4. The switching devices SW1-SW4 are controlled by a mode control signal generated by a controller (e.g., such as controller 410 or 510), not explicitly shown in FIG. 7. The voltage droop compensation circuit 750 may be configured similar to voltage droop compensation circuit 450 or 550 including an associated fifth switching device SW5 coupled between the first voltage rail Vdd and the voltage droop compensation circuit 750. The fifth switching device SW5 is responsive to the enable signal generated by the controller 410 or 510.

In operation, if the controller generates the mode control signal to set the first (e.g., relatively small load current or LPM) mode of operation, the first and third switching devices SW1 and SW3 are open, and the second and fourth switching devices SW2 and SW4 are closed. In this configuration, the gate voltage handover circuit 730 couples the second voltage rail (e.g., ground or $Vdrv_y=0V$) to the gate of the second set of one or more FETs M2 via the second and fourth switching devices SW2 and SW4 to disable or turn off the second set of one or more FETs M2. The first and third switching devices SW1 and SW3 are open to substantially isolate the gate of the first set of one or more FETs M1 and the output of the voltage droop compensation circuit 750 from the second voltage rail (e.g., ground).

If the controller generates the mode control signal to set the second (e.g., relatively large load current or NPM) mode of operation, the first switching device SW1 is closed, and the second and third switching devices SW2 and SW3, as well as the fourth switching device SW4 are open. In this configuration, the gate voltage handover circuit 730 couples the output of the gate voltage control circuit 720 to the gate of the second set of one or more FETs M2 via the first switching device SW1 to provide it the gate voltage $Vdrv_x$ (e.g., $Vdrv_y=Vdrv_x$) to the gate of the second set of one or more FETs M2 so that the second set of one or more FETs M2 is enabled or turned on, and controlled by the gate voltage $Vdrv_x$. The second to fourth switching devices SW2-SW4 are open to substantially isolate the gates of the first and second sets of one or more FETs M1 and M2 from the second voltage rail (e.g., ground) and the output of the voltage droop compensation circuit 750.

Further, during the transition from the first mode of operation to the second mode of operation (e.g., from LPM to NPM), the gate voltage handover circuit 730 is configured to route the transient enhancement voltage $V_{TE}$ generated by the voltage droop compensation circuit 750 to the gate of the second set of one or more FETs M2. Accordingly, during the transition, the enable signal generated by the controller closes the fifth switching device SW5 to couple the first voltage rail Vdd to the voltage droop compensation circuit 750 to enable the latter. In accordance with the transition configuration, the first and second switching devices SW1-SW2 are open, and the third and fourth switching devices SW3-SW4 are closed. In this configuration, the gate voltage handover circuit 730 routes the transition enhancement voltage $V_{TE}$ from the voltage droop compensation circuit 750 to the gate of the second set of one or more FETs M2. This enables or turns on the second set of one or more FETs M2 during the transition to reduce the output voltage droop and regulate the output voltage Vout to a range bounded by the first threshold voltage Vtgt+ΔV and the second threshold voltage Vtgt−ΔV.

Figure 8:
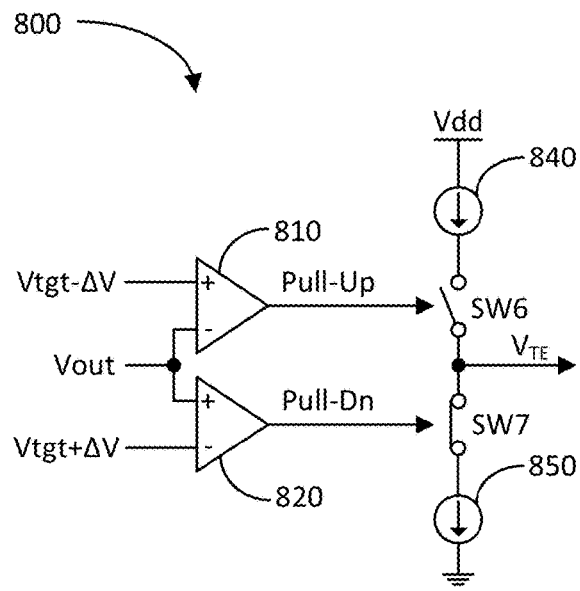
FIG. 8 illustrates a schematic diagram of an example push-pull charge pump in accordance with another aspect of the disclosure.

FIG. 8 illustrates a schematic diagram of an example voltage regulator 800 in accordance with another aspect of the disclosure. The voltage regulator 800 may be a more detailed example of the voltage regulator including the push-pull charge pump 558 and comparators 560 and 562.

More specifically, the voltage regulator 800 includes a first comparator 810, a second comparator 820, a first current source 840, a second current source 850, a first switching device SW6, and a second switching device SW7. The first comparator 810 includes a first (e.g., positive) input configured to receive the second threshold voltage Vtgt−ΔV, a second (e.g., negative) input configured to receive the output voltage Vout, and an output coupled to the switching device SW6. The second comparator 820 includes a first (e.g., positive) input configured to receive the output voltage Vout, a second input to receive the first threshold voltage Vtgt+ΔV, and an output coupled to the switching device SW7. The first current source 840, switching devices SW6-SW7, and the second current source 850, which serves as the push-pull charge pump, are coupled in series in that order between the first voltage rail Vdd and the second voltage rail (e.g., ground). The node between the switching devices SW6 and SW7 serves as the output of the voltage regulator 800 for generating the transient enhancement voltage $V_{TE}$, and is coupled to the gate of the second set of one or more FETs M2 via a gate voltage handover circuit.

In operation, if the output voltage Vout decreases below the second threshold voltage Vtgt−ΔV, the first comparator 810 generates a logic high signal to close the switching device SW6; thereby allowing the first current source 840 to supply current to the output so that the transient enhancement voltage $V_{TE}$ increases. As previously discussed, during the transition from LPM to NPM mode, the gate handover circuit routes the transient enhancement voltage $V_{TE}$ to the gate of the second set of one or more FETs M2. The increased transient enhancement voltage $V_{TE}$ drives the second set of one or more FETs M2 harder so that they supply more current to the output of the LDO voltage regulator. This causes the output voltage Vout to increase above the second threshold voltage Vtgt−ΔV; and in response, the first comparator 810 generates a logic low signal to open the switching device SW6 as the output voltage Vout is above the second threshold voltage Vtgt−ΔV.

If the output voltage Vout increases above the first threshold voltage Vtgt+ΔV, the second comparator 820 generates a logic high signal to close the switching device SW7; thereby allowing the second current source 850 to sink current from the output so that the transient enhancement voltage $V_{TE}$ decreases. As previously discussed, during the transition from LPM to NPM mode, the gate handover circuit routes the transition enhancement voltage $V_{TE}$ to the gate of the second set of one or more FETs M2. The decreased transient enhancement voltage $V_{TE}$ drives the second set of one or more FETs M2 less so that they supply less current to the output of the LDO voltage regulator. This causes the output voltage Vout to decrease below the first threshold voltage Vtgt+ΔV; and in response, the second comparator 820 generates a logic low signal to open the switching device SW7 as the output voltage Vout is below the second threshold voltage Vtgt+ΔV. Thus, the voltage regulator 800 regulates the output voltage Vout within a range bounded by the first threshold voltage Vtgt+ΔV and the second threshold voltage Vtgt−ΔV.

Although the voltage regulator 800 includes the pull-up and pull-down current sources 840 and 850 (and associated circuitry 810/SW6 and 820/SW7) to regulate the output voltage Vout within the range bounded by Vtgt+ΔV and Vtgt−ΔV, it shall be understood that the voltage regulator 800 may include additional pull-up and pull-down current sources with different strengths (and associated circuitry) to regulate the output voltage Vout to within different ranges (e.g., Vtgt±ΔV, Vtgt±ΔV/2, Vtgt±ΔV/4, etc.). Such additional ranges may improve the speed and smoothness of the transient response of the output voltage Vout.

Figure 9:
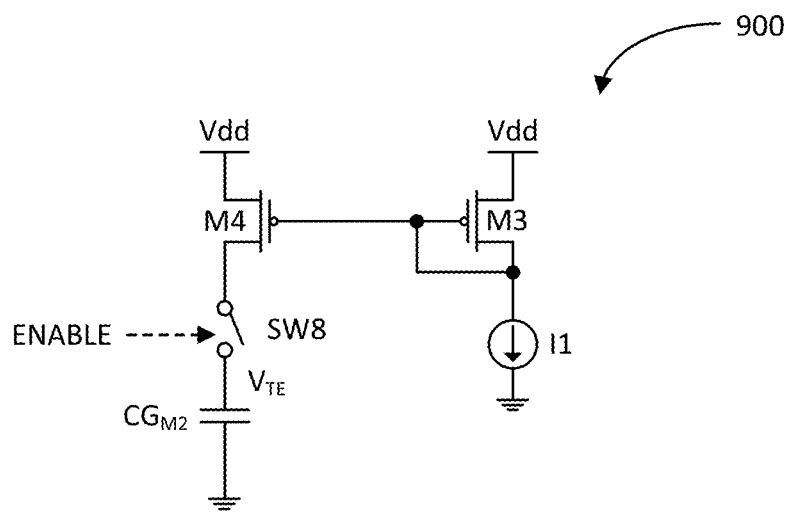
FIG. 9 illustrates a schematic diagram of an example gate charging circuit in accordance with another aspect of the disclosure.

FIG. 9 illustrates a schematic diagram of an example gate charging circuit 900 in accordance with another aspect of the disclosure. The gate charging circuit 900 may be an example of the gate charging circuit 456 or 556 previously discussed.

The gate charging circuit 900 includes a first FET M3 (e.g., a p-channel metal oxide semiconductor (PMOS) FET) and a first current source Il coupled in series between a first voltage rail Vdd and a second voltage rail (e.g., ground). The first FET M3 includes a gate and a drain coupled together. The gate charging circuit 900 further includes a second FET M4 (e.g., a PMOS FET) coupled in series with a switching device SW8 between the first voltage rail Vdd and the gate of the second set of one or more FETs M2, which is represented in FIG. 9 as gate capacitance $CG_{M2}$ coupled to ground.

The second FET M4 includes a gate coupled to the gate/drain of the first FET M3 such that the FETs M3-M4 are in a current mirror configuration. The second FET M4 may be sized a factor X larger than the first FET M3 such that the current through the second FET M4 is X times larger than the current through the first FET M3. The enable signal generated by the controller of the LDO voltage regulator controls the closed/open state of switching device SW8. For example, if the enable signal is not asserted, the switching device SW8 is open; thereby, disabling the gate charging circuit 900. If the enable signal is asserted, the switching device SW8 is closed; thereby, generating a current through the second FET M4 that charges the gate of the second set of one or more FETs M2 to generate the transient enhancement gate voltage $V_{TE}$ for driving the second set of one or more FETs M2.

Figure 10:
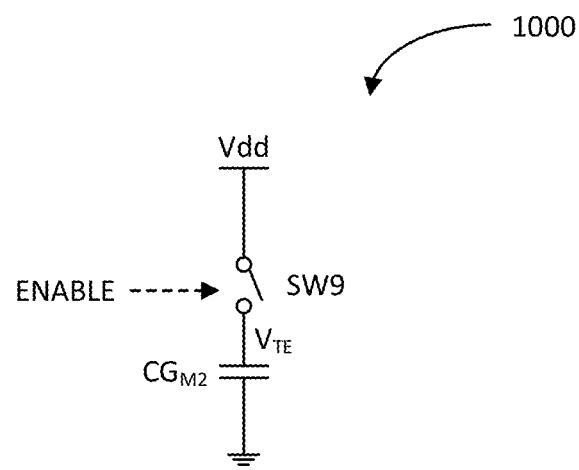
FIG. 10 illustrates a schematic diagram of another example gate charging circuit in accordance with another aspect of the disclosure.

FIG. 10 illustrates a schematic diagram of another example gate charging circuit 1000 in accordance with another aspect of the disclosure. The gate charging circuit 1000 may be another example of the gate charging circuit 456 or 556 previously discussed.

The gate charging circuit 1000 includes a switching device SW9 coupled between the first voltage rail Vdd and the gate of the second set of one or more FETs, which is represented in FIG. 10 as gate capacitance $CG_{M2}$ coupled to ground. The enable signal generated by the controller of the LDO voltage regulator controls the closed/open state of switching device SW9. For example, if the enable signal is not asserted, the switching device SW9 is open; thereby, disabling the gate charging circuit 1000. If the enable signal is asserted, the switching device SW9 is closed; thereby, generating a current through the switching device SW9 that charges the gate of the second set of one or more FETs M2 to generate the transient enhancement gate voltage $V_{TE}$ for driving the second set of one or more FETs M2.

Figure 11:
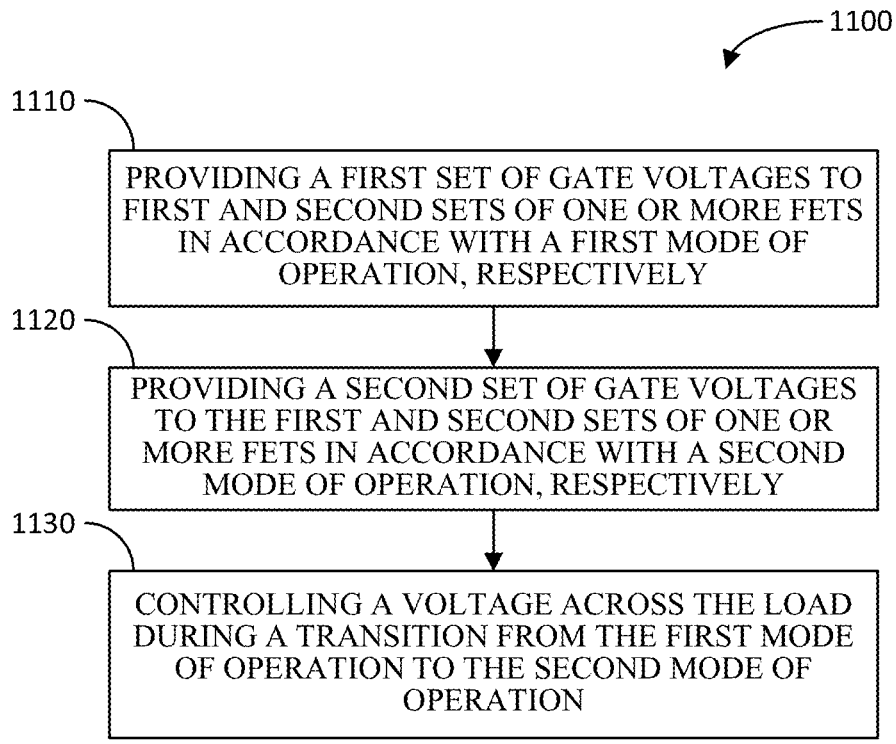
FIG. 11 illustrates a flow diagram of an example method of generating a voltage across a load in accordance with another aspect of the disclosure.

FIG. 11 illustrates a flow diagram of an example method 1100 of generating a voltage across a load in accordance with another aspect of the disclosure. The method 1100 includes providing a first set of gate voltages to first and second gates of first and second sets of one or more FETs in accordance with a first mode of operation, respectively, wherein the first and second sets of one or more FETs are coupled between a voltage rail and a load (block 1110). Examples of means for providing a first set of gate voltages to first and second gates of first and second sets of one or more FETs in accordance with a first mode of operation, respectively, include any of the gate voltage control circuits 420, 520, and 720 and gate voltage handover circuits 430, 530, and 730 described herein. An example of the first set of gate voltages may be $Vdrv_x$ and ground in accordance with the LPM mode of operation.

The method 1100 further includes providing a second set of gate voltages to the first and second gates of the first and second sets of one or more FETs in accordance with a second mode of operation, respectively (block 1120). Examples of means for providing a second set of gate voltages to first and second gates of first and second sets of one or more FETs in accordance with a second mode of operation, respectively, include any of the gate voltage control circuits 420, 520, and 720 and gate voltage handover circuits 430, 530, and 730 described herein. An examples of the second set of gate voltages may be $Vdrv_x$ provided to the first and second sets of one or more FETs M1 and M2 in accordance with the NPM mode of operation.

Additionally, the method 1100 includes controlling a voltage across the load during a transition from the first mode of operation to the second mode of operation (block 1130). Examples of means for controlling a voltage across the load during a transition from the first mode of operation to the second mode of operation include any of the voltage droop compensation circuits described herein.

The controlling of voltage as specified in block 1130 may include generating a voltage droop detection signal in response to detecting a voltage droop in the voltage. Examples of means for generating a voltage droop detection signal in response to detecting a voltage droop in the output voltage include any of the voltage droop detectors described herein. The controlling of the voltage as specified in block 1130 may include charging the second gate of the second set of one or more FETs in response to the voltage droop detection signal. Examples of means for charging the second gate of the second set of one or more FETs in response to the voltage droop detection signal include any of the gate charging circuits described herein.

The controlling of voltage as specified in block 1130 may include regulating the voltage in response to the voltage reaching a first threshold voltage in response to the charging of the second gate of the second set of one or more FETs. Examples of means for regulating the voltage in response to the voltage reaching a first threshold voltage in response to the charging of the second gate of the second set of one or more FETs include any of the voltage regulators described herein. Further, the regulating of the voltage may include regulating the voltage to within a range bounded by the first threshold voltage and a second threshold voltage. Examples of means for regulating the voltage to within a range bounded by the first threshold voltage and a second threshold voltage include any of the voltage regulators described herein.

Figure 12:
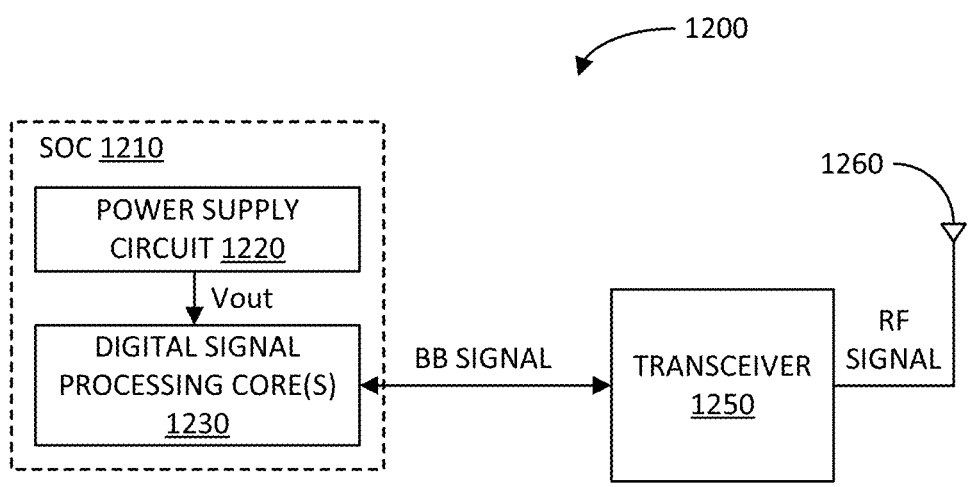
FIG. 12 illustrates a block diagram of an example wireless communication device in accordance with another aspect of the disclosure.

FIG. 12 illustrates a block diagram of an example wireless communication device 1200 in accordance with another aspect of the disclosure. The wireless communication device 1200 includes an integrated circuit (IC) 1210, which may be configured as a system on chip (SOC). The SOC 1210 includes one or more digital signal processing cores 1230 configured to process a baseband (BB) signal. The SOC 1210 may further include a power supply circuit 1220, which may be configured per any of the LDO voltage regulators described herein. The power supply circuit 1220 is configured to generate and provide a supply voltage Vout to the one or more digital signal processing cores 1230.

The wireless communication device 1200 further includes a transceiver 1250 and at least one antenna 1260 (e.g., an antenna array). Pursuant to a signal transmission operation, the one or more digital signal processing cores 1230 generate and provide a BB transmit signal to the transceiver 1250. The transceiver 1250 is configured to generate a radio frequency (RF) transmit signal based on the BB transmit signal (e.g., frequency up-conversion, RF filtering, pre-amplifying, phase shifting, power amplifying, etc.). The transceiver 1250 provides the RF transmit signal to the at least one antenna 1260 for wireless transmission.

The following provides an overview of aspect of the present disclosure:

Pursuant to a signal reception operation, the at least one antenna 1260 is configured to wirelessly receives an RF receive signal. The transceiver 1250 is configured to generate a BB receive signal based on the RF receive signal (e.g., low noise amplifying, filtering, amplifying, phase shifting, frequency down-conversion, BB filtering, etc.). The one or more digital signal processing cores 1230 is configured to process the BB receive signal received from the transceiver 1250.

Aspect 1: An apparatus, including a first set of one or more field effect transistors (FETs) coupled between a first voltage rail and a load; a second set of one or more FETs coupled between the first voltage rail and the load; a gate voltage control circuit configured to: provide a first set of gate voltages to first and second gates of the first and second sets of one or more FETs in accordance with a first mode of operation, respectively; and provide a second set of gate voltages to the first and second gates of the first and second sets of one or more FETs in accordance with a second mode of operation, respectively; and a voltage droop compensation circuit configured to control an output voltage across the load during a transition from the first mode of operation to the second mode of operation.

Aspect 2: The apparatus of aspect 1, wherein the first set of one or more FETs includes a first effective channel width to length ratio (W/L), wherein the second set of one or more FETs includes a second effective W/L, and wherein the second effective W/L is larger than the first effective W/L.

Aspect 3: The apparatus of aspect 1 or 2, wherein the voltage droop compensation circuit comprises a voltage droop detector configured to generate a voltage droop detection signal in response to detecting a voltage droop in the output voltage that decrease to or below a reference voltage.

Aspect 4: The apparatus of aspect 3, wherein the voltage droop detector comprises comparator including a first input configured to receive the output voltage, a second input configured to receive the reference voltage, and an output configured to produce the voltage droop detection signal.

Aspect 5: The apparatus of aspect 3 or 4, wherein the voltage droop compensation circuit further comprises a voltage control circuit configured to control the output voltage in response to the voltage droop detection signal.

Aspect 6: The apparatus of aspect 5, wherein the voltage control circuit comprises a gate charging circuit configured to charge the second gate of the second set of one or more FETs in response to the voltage droop detection signal.

Aspect 7: The apparatus of aspect 6, wherein the gate charging circuit comprises a switching device coupled between the first voltage rail and the second gate of the second set of one or more FETs.

Aspect 8: The apparatus of aspect 6, wherein the gate charging circuit comprises: a first FET including a gate and a drain coupled together; a current source coupled in series with the first FET between the first voltage rail and a second voltage rail; and a second FET coupled in series with a switching device between the first voltage rail and the second gate of the second set of one or more FETs, wherein the second FET includes a gate coupled to the gate of the first FET.

Aspect 9: The apparatus of aspect 6, 7, or 8, wherein the voltage control circuit further comprises a voltage regulator configured to regulate the output voltage in response to the output voltage reaching a first threshold voltage in response to the charging of the second gate of the second set of one or more FETs.

Aspect 10: The apparatus of aspect 9, wherein the voltage regulator is configured to disable the gate charging circuit in response to the output voltage reaching the first threshold voltage.

Aspect 11: The apparatus of aspect 9 or 10, wherein the voltage regulator is configured to regulate the output voltage to within a range bounded by the first threshold voltage and a second threshold voltage.

Aspect 12: The apparatus of aspect 9, 10, or 11, wherein the voltage regulator comprises: a push-pull charge pump; a first comparator including a first input configured to receive a second threshold voltage, a second input configured to receive the output voltage, and an output coupled to the push-pull charge pump; and a second comparator including a first input configured to receive the output voltage, a second input configured to receive the first threshold voltage, and an output coupled to the push-pull charge pump.

Aspect 13: The apparatus of aspect 9, 10, or 11, wherein the voltage regulator comprises: a first current source; a first switching device; a second switching device; a second current source, wherein the first current source, the first switching device, the second switching device, and the second current source are coupled in series between the first voltage rail and a second voltage rail, and wherein a node between the first and second switching devices is coupled to the second gate of the second set of one or more FETs; a first comparator including a first input configured to receive the second threshold voltage, a second input configured to receive the output voltage, and an output coupled to the first switching device; and a second comparator including a first input configured to receive the output voltage, a second input configured to receive the first threshold voltage, and an output coupled to the second switching device.

Aspect 14: The apparatus of aspect 13, wherein the output of the second comparator is coupled to the gate charging circuit.

Aspect 15: The apparatus of any one of aspects 1-14, further comprising a gate voltage handover circuit configured to: route one of the first set of gate voltages to the second gate of the second set of one or more FETs in accordance with the first mode of operation; and route one of the second set of gate voltages to the second gate of the second set of one or more FETs in accordance with the second mode of operation.

Aspect 16: The apparatus of aspect 15, wherein the gate voltage handover circuit comprises: a first switching device coupled between the first gate of the first set of one or more FETs and the second gate of the second set of one or more FETs; a second switching device coupled between a second voltage rail and the second gate of the second set of one or more FETs; and a third switching device coupled between the voltage droop compensation circuit and the second gate of the second set of one or more FETs.

Aspect 17: The apparatus of aspect 16, further comprising a controller configured to: open the first and third switching devices and close the second switching device in accordance with the first mode of operation; open the second and third switching devices and close the first switching device in accordance with the second mode of operation; and open the second switching device and close the first and third switching devices during the transition from the first mode of operation to the second mode of operation.

Aspect 18: The apparatus of aspect 17, wherein the gate voltage handover circuit further comprises a fourth switching device coupled between the second and third switching devices and the second gate of the second set of one or more FETs, wherein the controller is further configured to: close the fourth switching device in accordance with the first mode of operation; open the fourth switching device in accordance with the second mode of operation; and close the fourth switching device during the transition from the first mode of operation to the second mode of operation.

Aspect 19: A method, comprising: providing a first set of gate voltages to first and second gates of first and second sets of one or more FETs in accordance with a first mode of operation, respectively, wherein the first and second sets of one or more FETs are coupled between a voltage rail and a load; providing a second set of gate voltages to the first and second gates of the first and second sets of one or more FETs in accordance with a second mode of operation, respectively; and controlling an output voltage across the load during a transition from the first mode of operation to the second mode of operation.

Aspect 20: The method of aspect 19, wherein controlling the output voltage comprises generating a voltage droop detection signal in response to detecting a voltage droop in the output voltage.

Aspect 21: The method of aspect 20, wherein controlling the output voltage further comprises charging the second gate of the second set of one or more FETs in response to the voltage droop detection signal.

Aspect 22: The method of aspect 21, wherein controlling the output voltage further comprises regulating the output voltage in response to the output voltage reaching a first threshold voltage in response to the charging of the second gate of the second set of one or more FETs.

Aspect 23: The method of aspect 22, wherein regulating the output voltage comprises regulating the output voltage to within a range bounded by the first threshold voltage and a second threshold voltage.

Aspect 24: An apparatus, comprising: means for providing a first set of gate voltages to first and second gates of first and second sets of one or more FETs in accordance with a first mode of operation, respectively, wherein the first and second sets of one or more FETs are coupled between a voltage rail and a load; means for providing a second set of gate voltages to the first and second gates of the first and second sets of one or more FETs in accordance with a second mode of operation, respectively; and means for controlling an output voltage across the load during a transition from the first mode of operation to the second mode of operation.

Aspect 25: The apparatus of aspect 24, wherein the means for controlling the output voltage comprises means for generating a voltage droop detection signal in response to detecting a voltage droop in the output voltage.

Aspect 26: The apparatus of aspect 25, wherein the means for controlling the output voltage further comprises means for charging the second gate of the second set of one or more FETs in response to the voltage droop detection signal.

Aspect 27: The apparatus of aspect 26, wherein the means for controlling the output voltage further comprises means for regulating the output voltage in response to the output voltage reaching a first threshold voltage in response to the charging of the second gate of the second set of one or more FETs.

Aspect 28: The apparatus of aspect 27, wherein the means for regulating the output voltage comprises means for regulating the output voltage to within a range bounded by the first threshold voltage and a second threshold voltage.

Aspect 29: A wireless communication device, comprising: at least one antenna; a transceiver configured to: receive a radio frequency (RF) receive signal via the at least one antenna and process the RF receive signal to generate a baseband (BB) receive signal; and receive a BB transmit signal and process the BB transmit signal to generate an RF transmit signal, wherein the RF transmit signal is provided to the at least one antenna for wireless transmission; one or more digital processing cores configured to process the BB receive signal and generate the BB transmit signal; and a power supply circuit configured to provide a supply voltage to the one or more digital processing cores, wherein the power supply circuit comprises: a first set of one or more field effect transistors (FETs) coupled between a voltage rail and the one or more digital processing cores; a second set of one or more FETs coupled between the voltage rail and the one or more digital processing cores; a gate voltage control circuit configured to: provide a first set of gate voltages to first and second gates of the first and second sets of one or more FETs in accordance with a first mode of operation, respectively; and provide a second set of gate voltages to the first and second gates of the first and second sets of one or more FETs in accordance with a second mode of operation, respectively; and a voltage droop compensation circuit configured to control the supply voltage during a transition from the first mode of operation to the second mode of operation.

Aspect 30: The wireless communication device of aspect 29, wherein the voltage droop compensation circuit comprises: a voltage droop detector configured to generate a voltage droop detection signal in response to detecting a voltage droop in the supply voltage; a gate charging circuit configured to charge the second gate of the second set of one or more FETs in response to the voltage droop detection signal; and a voltage regulator configured to regulate the supply voltage in response to the supply voltage reaching a threshold voltage in response to the charging of the second gate of the second set of one or more FETs.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
   a first set of one or more field effect transistors (FETs) coupled between a first voltage rail and a load;
   a second set of one or more FETs coupled between the first voltage rail and the load;
   a gate voltage control circuit configured to:
     provide a first set of gate voltages to first and second gates of the first and second sets of one or more FETs in accordance with a first mode of operation, respectively; and
     provide a second set of gate voltages to the first and second gates of the first and second sets of one or more FETs in accordance with a second mode of operation, respectively; and
   a voltage droop compensation circuit configured to generate a third gate voltage applied to the second gate of the second set of one or more FETs to control an output voltage across the load during a transition from the first mode of operation to the second mode of operation, wherein the voltage droop compensation circuit comprises a voltage droop detector configured to generate a voltage droop detection signal in response to detecting a voltage droop in the output voltage that decrease to or below a reference voltage, wherein the voltage droop compensation circuit further comprises a voltage control circuit configured to control the output voltage in response to the voltage droop detection signal, wherein the gate voltage control circuit is isolated from the second gate of the second set of one or more FETs during the transition, and wherein the voltage control circuit comprises a gate charging circuit configured to charge the second gate of the second set of one or more FETs in response to the voltage droop detection signal.

2. The apparatus of claim 1, wherein the first set of one or more FETs includes a first effective channel width to length ratio (W/L), wherein the second set of one or more FETs includes a second effective W/L, and wherein the second effective W/L is larger than the first effective W/L.

3. The apparatus of claim 1, wherein the voltage droop detector comprises a comparator including a first input configured to receive the output voltage, a second input configured to receive the reference voltage, and an output configured to produce the voltage droop detection signal.

4. The apparatus of claim 1, wherein the gate charging circuit comprises a switching device coupled between the first voltage rail and the second gate of the second set of one or more FETs.

5. The apparatus of claim 1, wherein the gate charging circuit comprises:
   a first FET including a gate and a drain coupled together;
   a current source coupled in series with the first FET between the first voltage rail and a second voltage rail; and
   a second FET coupled in series with a switching device between the first voltage rail and the second gate of the second set of one or more FETs, wherein the second FET includes a gate coupled to the gate of the first FET.

6. The apparatus of claim 1, wherein the voltage control circuit further comprises a voltage regulator configured to regulate the output voltage in response to the output voltage reaching a first threshold voltage in response to the charging of the second gate of the second set of one or more FETs.

7. The apparatus of claim 6, wherein the voltage regulator is configured to disable the gate charging circuit in response to the output voltage reaching the first threshold voltage.

8. The apparatus of claim 6, wherein the voltage regulator is configured to regulate the output voltage to within a range bounded by the first threshold voltage and a second threshold voltage.

9. The apparatus of claim 6, wherein the voltage regulator comprises:
   a push-pull charge pump;
   a first comparator including a first input configured to receive a second threshold voltage, a second input configured to receive the output voltage, and an output coupled to the push-pull charge pump; and
   a second comparator including a first input configured to receive the output voltage, a second input configured to receive the first threshold voltage, and an output coupled to the push-pull charge pump.

10. The apparatus of claim 6, wherein the voltage regulator comprises:
    a first current source;
    a first switching device;
    a second switching device;
    a second current source, wherein the first current source, the first switching device, the second switching device, and the second current source are coupled in series between the first voltage rail and a second voltage rail, and wherein a node between the first and second switching devices is coupled to the second gate of the second set of one or more FETs;
    a first comparator including a first input configured to receive the second threshold voltage, a second input configured to receive the output voltage, and an output coupled to the first switching device; and
    a second comparator including a first input configured to receive the output voltage, a second input configured to receive the first threshold voltage, and an output coupled to the second switching device.

11. The apparatus of claim 10, wherein the output of the second comparator is coupled to the gate charging circuit.

12. An apparatus, comprising:
    a first set of one or more field effect transistors (FETs) coupled between a first voltage rail and a load;
    a second set of one or more FETs coupled between the first voltage rail and the load;
    a gate voltage control circuit configured to:
      provide a first set of gate voltages to first and second gates of the first and second sets of one or more FETs in accordance with a first mode of operation, respectively; and
      provide a second set of gate voltages to the first and second gates of the first and second sets of one or more FETs in accordance with a second mode of operation, respectively;

a voltage droop compensation circuit configured to generate a third gate voltage applied to the second gate of the second set of one or more FETs to control an output voltage across the load during a transition from the first mode of operation to the second mode of operation, wherein the gate voltage control circuit is isolated from the second gate of the second set of one or more FETs during the transition; and a gate voltage handover circuit configured to:

route one of the first set of gate voltages to the second gate of the second set of one or more FETs in accordance with the first mode of operation; and route one of the second set of gate voltages to the second gate of the second set of one or more FETs in accordance with the second mode of operation, wherein the gate voltage handover circuit comprises:

a first switching device coupled between the first gate of the first set of one or more FETs and the second gate of the second set of one or more FETs;

a second switching device coupled between a second voltage rail and the second gate of the second set of one or more FETs; and a third switching device coupled between the voltage droop compensation circuit and the second gate of the second set of one or more FETs.

13. The apparatus of claim 12, further comprising a controller configured to:

open the first and third switching devices and close the second switching device in accordance with the first mode of operation;

open the second and third switching devices and close the first switching device in accordance with the second mode of operation; and open the second switching device and close the first and third switching devices during the transition from the first mode of operation to the second mode of operation.

14. The apparatus of claim 13, wherein the gate voltage handover circuit further comprises a fourth switching device coupled between the second and third switching devices and the second gate of the second set of one or more FETs, wherein the controller is further configured to:

close the fourth switching device in accordance with the first mode of operation;

open the fourth switching device in accordance with the second mode of operation; and close the fourth switching device during the transition from the first mode of operation to the second mode of operation.

15. A method, comprising:

providing a first set of gate voltages to first and second gates of first and second sets of one or more FETs in accordance with a first mode of operation, respectively, wherein the first and second sets of one or more FETs are coupled between a voltage rail and a load;

providing a second set of gate voltages to the first and second gates of the first and second sets of one or more FETs in accordance with a second mode of operation, respectively; and controlling an output voltage across the load during a transition from the first mode of operation to the second mode of operation, wherein controlling the output voltage comprises providing a third gate voltage to the second gates of the second set of one or more FETs while isolating a source of the first and second sets of gate voltages from the second gate of the second set of one or more FETs, wherein controlling the output voltage comprises generating a voltage droop detection signal in response to detecting a voltage droop in the output voltage, wherein controlling the output voltage further comprises charging the second gate of the second set of one or more FETs in response to the voltage droop detection signal.

16. The method of claim 15, wherein controlling the output voltage further comprises regulating the output voltage in response to the output voltage reaching a first threshold voltage in response to the charging of the second gate of the second set of one or more FETs.

17. The method of claim 16, wherein regulating the output voltage comprises regulating the output voltage to within a range bounded by the first threshold voltage and a second threshold voltage.

18. An apparatus, comprising:

means for providing a first set of gate voltages to first and second gates of first and second sets of one or more FETs in accordance with a first mode of operation, respectively, wherein the first and second sets of one or more FETs are coupled between a voltage rail and a load;

means for providing a second set of gate voltages to the first and second gates of the first and second sets of one or more FETs in accordance with a second mode of operation, respectively; and means for controlling an output voltage across the load during a transition from the first mode of operation to the second mode of operation, wherein the means for controlling the output voltage comprises means for providing a third gate voltage to the second gate of the second set of one or more FETs including means for isolating the means for providing the first and second sets of gate voltages from the second gate of the second set of one or more FETs during the transition, wherein the means for controlling the output voltage comprises means for generating a voltage droop detection signal in response to detecting a voltage droop in the output voltage, wherein the means for controlling the output voltage further comprises means for charging the second gate of the second set of one or more FETs in response to the voltage droop detection signal.

19. The apparatus of claim 18, wherein the means for controlling the output voltage further comprises means for regulating the output voltage in response to the output voltage reaching a first threshold voltage in response to the charging of the second gate of the second set of one or more FETs.

20. The apparatus of claim 19, wherein the means for regulating the output voltage comprises means for regulating the output voltage to within a range bounded by the first threshold voltage and a second threshold voltage.

21. A wireless communication device, comprising:

at least one antenna;

a transceiver configured to:

receive a radio frequency (RF) receive signal via the at least one antenna and process the RF receive signal to generate a baseband (BB) receive signal; and receive a BB transmit signal and process the BB transmit signal to generate an RF transmit signal, wherein the RF transmit signal is provided to the at least one antenna for wireless transmission;

one or more digital processing cores configured to process the BB receive signal and generate the BB transmit signal; and a power supply circuit configured to provide a supply voltage to the one or more digital processing cores, wherein the power supply circuit comprises:
  a first set of one or more field effect transistors (FETs) coupled between a voltage rail and the one or more digital processing cores;
  a second set of one or more FETs coupled between the voltage rail and the one or more digital processing cores;
  a gate voltage control circuit configured to:
    provide a first set of gate voltages to first and second gates of the first and second sets of one or more FETs in accordance with a first mode of operation, respectively; and
    provide a second set of gate voltages to the first and second gates of the first and second sets of one or more FETs in accordance with a second mode of operation, respectively; and
  a voltage droop compensation circuit configured to generate a third gate voltage applied to the second gate of the second set of one or more FETs to control the supply voltage during a transition from the first mode of operation to the second mode of operation, wherein the gate voltage control circuit is isolated from the second gate of the second set of one or more FETs during the transition, wherein the voltage droop compensation circuit comprises:
    a voltage droop detector configured to generate a voltage droop detection signal in response to detecting a voltage droop in the supply voltage;
    a gate charging circuit configured to charge the second gate of the second set of one or more FETs in response to the voltage droop detection signal; and
    a voltage regulator configured to regulate the supply voltage in response to the supply voltage reaching a threshold voltage in response to the charging of the second gate of the second set of one or more FETs.

\* \* \* \* \*